United States Patent [19]
Schmidhuber et al.

[11] Patent Number: 5,851,051
[45] Date of Patent: Dec. 22, 1998

[54] COVER OF A SLIDING-LIFTING ROOF OR LIFTING ROOF, AND A TOOL FOR ITS MANUFACTURE

[75] Inventors: Horst Schmidhuber, Schondorf; Christoph Noga, Lünen, both of Germany

[73] Assignee: Webasto Systemkomponenten GmbH, Stockdorf, Germany

[21] Appl. No.: 660,767

[22] Filed: Jun. 10, 1996

[30] Foreign Application Priority Data

Jun. 10, 1995 [DE] Germany ............. 195 21 279.7

[51] Int. Cl.$^6$ ............................. B60J 7/04
[52] U.S. Cl. ................... 296/216.06; 296/216.09
[58] Field of Search ................. 296/216, 217, 296/212, 216.06, 216.07, 216.09

[56] References Cited

U.S. PATENT DOCUMENTS

| | | | |
|---|---|---|---|
| 4,312,534 | 1/1982 | Jardin et al. | 296/216.07 X |
| 4,323,277 | 4/1982 | Rengstl et al. | 296/216.06 |
| 4,487,449 | 12/1984 | Igel et al. | 296/216.07 |
| 4,509,791 | 4/1985 | Bienert et al. | 296/216 |
| 4,676,493 | 6/1987 | Helbig | 296/216 |
| 4,738,482 | 4/1988 | Bohm et al. | 296/216 |
| 4,765,676 | 8/1988 | Grimm et al. | 296/216 |
| 4,867,503 | 9/1989 | Luksch et al. | 296/217 |
| 5,039,161 | 8/1991 | Schmidhuber et al. | 296/216.06 X |
| 5,234,250 | 8/1993 | Hattass et al. | 296/216 |
| 5,344,603 | 9/1994 | Jardin et al. | |
| 5,372,401 | 12/1994 | Odoi et al. | 296/216.06 X |

FOREIGN PATENT DOCUMENTS 3442653  6/1986  Germany .

*Primary Examiner*—Joseph D. Pape
*Attorney, Agent, or Firm*—Sixbey, Friedman, Leedom & Ferguson; David S. Safran

[57] ABSTRACT

A cover (3) of a sliding-lifting roof or a lifting roof, which serves to selectively close or, at least partially, expose a roof opening in a vehicle roof (1). The vehicle roof (1) is provided with a seal (4). A specific surface roughness (8) is provided, at least in the area of the cover front edge (7), in order to avoid squeaking or creaking noises during pivoting movement of the cover (3). This roughness, preferably, is created during injection molding or foam casting of the cover (3) by a corresponding roughness provided on a shaping surface of the mold.

4 Claims, 2 Drawing Sheets

COVER OF A SLIDING-LIFTING ROOF OR LIFTING ROOF, AND A TOOL FOR ITS MANUFACTURE

BACKGROUND OF THE INVENTION

1. Field of the Invention

The invention relates to a cover of a sliding-lifting roof, or a lifting roof, for selectively closing, or at least partially, exposing a roof opening in a rigid vehicle roof, which opening, at least in the area of its front edge, is provided with a seal. The invention further relates to a tool for the manufacture of such a cover.

2. Description of Related Art

A vehicle roof with such a cover is known from German Patent No. 34 42 653. During pivoting movement for raising or lowering of the cover, squeaking or creaking noises occur as the result of friction between the cover's front edge and the seal in the area of the front edge of the roof opening. In the present state of the art of this technology, such noise development is prevented by providing the seal with a friction-reducing coating, as for instance, by the application of a lubricating matter in the area of the cover's contact surfaces. However, this entails the drawbacks of an additional work process step and additional material expenditure, and, furthermore, has the disadvantage of a tendency towards premature wear of such a coating.

SUMMARY OF THE INVENTION

It is the primary objective of the present invention to provide a vehicle cover and a tool for its manufacture which in a simple manner, precludes noise development during pivoting movement of the cover.

This objective is achieved, with regard to the cover, in that the cover, in a conventional manner, has a frame of synthetic material, extending at least along its front edge, preferably however, around its entire circumference, which, at its front edge facing the seal, has a surface roughness. Likewise, the surface roughness may extend across the entire peripheral surface of the synthetic material frame, facing the seal. Translucent covers for vehicle roofs having a border made of synthetic material are principally known, for instance, from published German application DE A1 42 38 889 and commonly assigned, co-pending U.S. patent application Ser. No. 08/154,422 which corresponds thereto.

The provision of a specific surface roughness, which, for instance, may be in the form of graining, changes the friction coefficient or the specific surface pressure, respectively, in the area where there is contact with the seal, to such an extent that squeaking or creaking noises are eliminated. The seal, cooperating with the edge of the cover, can be a commercially available seal and does not require additional coatings, or the like.

The simplest manner in which to obtain a frame with a specific roughness is that it, in a manner known as such, is manufactured by injection molding or foam casting in a mold whose shaping surface for the edge or edges facing the seal provides the surface roughness. Thus, each cover, during its manufacture is immediately imprinted with a surface roughness, thereby avoiding special working. Accordingly, working thereof occurs only once, i.e. in the melt.

A material especially suitable for the manufacture of a frame is polyurethane (PU).

It is of advantage when the average peak to valley height in the area of the front edge of the frame is approximately 70 $\mu$m to 90 $\mu$m.

The invention further relates to a mold for foam casting or injection molding of a cover of a sliding lifting roof, or a lifting roof having a frame of synthetic material, as is principally known from U.S. Pat. No. 5,344,603. In accordance with the present invention, the shaping surface of a mold at the type described in U.S. Pat. No. 5,344,603 is provided with a surface roughness at least in that area of the front edge, i.e., part of which is in front in the closed position, of the cover. The surface roughness, preferably, is produced by sand blasting, or, alternatively, by etching. The surface roughness of the mold, preferably, has an average peak to valley height of 70 $\mu$m to 90 $\mu$m.

The provision of a specific surface roughness solves, in a very simple manner, a problem that has existed for a long time. While the provision of surface roughness in the mold represents the simplest solution, the protection is to extend also to such covers in which the surface roughness is created subsequently, i.e. after the forming of the border.

These and further objects, features and advantages of the present invention will become apparent from the following description when taken in connection with the accompanying drawings which, for purposes of illustration only, show a single embodiment in accordance with the present invention.

DETAILED DESCRIPTION OF THE PREFERRED EMBODIMENT

Figure 1:
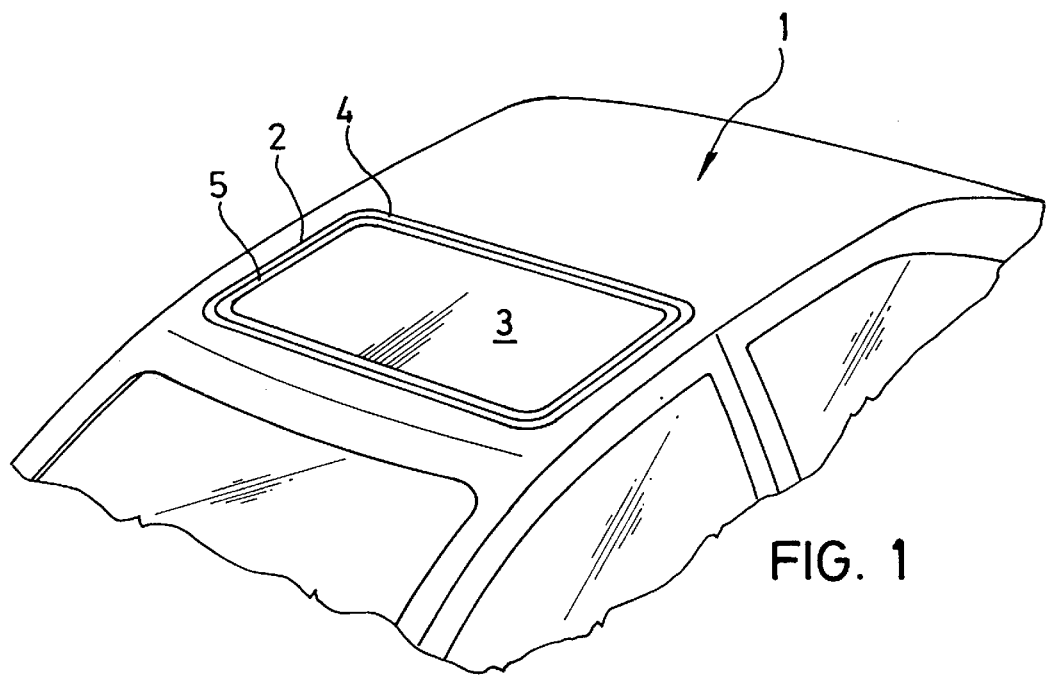
FIG. 1 shows a perspective view of a vehicle roof.

A rigid vehicle roof 1 has a roof opening 2, which, selectively, can be closed by means of cover 3, or, by raising the rear edge of cover 3, can be at least partially exposed. The edge of roof opening 2 is provided with a seal 4. Preferably, seal 4 extends peripherally around the edge of roof opening 2. However, for the realization of this invention, it suffices if there is a corresponding seal 4 in the area of the front edge of the cover 3.

Cover 3 is formed of a glass plate 6 and a frame portion 5 of synthetic material, which, preferably, surrounds glass plate 6 around its entire circumference. Frame 5 can be made of polyurethane material and is manufactured by injection molding. The front edge 7 of frame 5 interacts with seal 4 in the area of the front edge of roof opening 2, and has a surface roughness 8 whose mean peak to valley height is approximately 70 $\mu$m to 90 $\mu$m.

Figure 3:
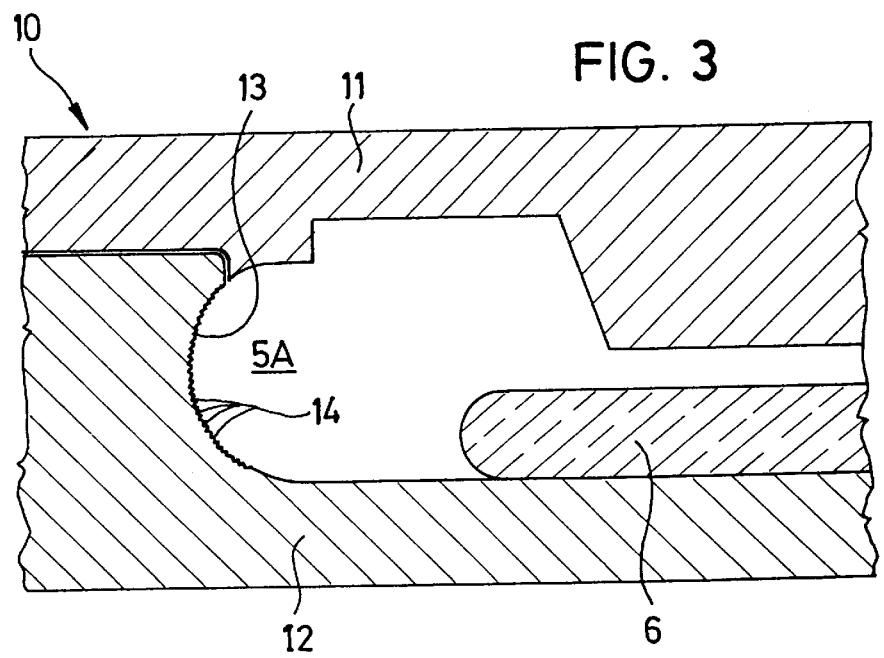
FIG. 3 shows a mold for the manufacture of a cover.
Figure 2:
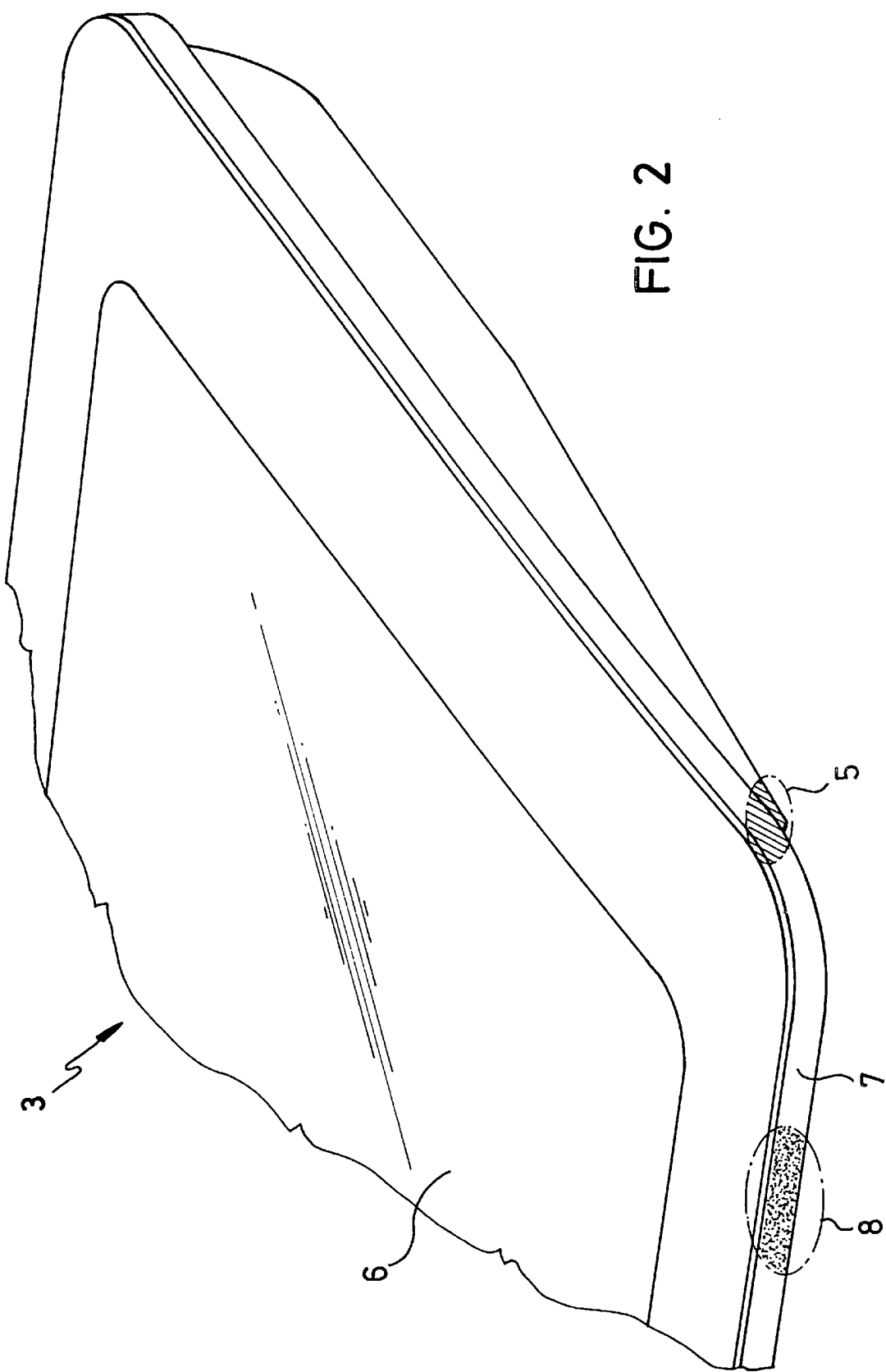
FIG. 2 shows a perspective partial view of a cover.

Cover 3 is manufactured in a mold, designated 10 as a whole, and which comprises an upper mold part 11 and a lower mold part 12. Tool 10 is depicted in FIG. 3 with merely the glass plate 6 already inserted into lower mold part 12. Cavity 5A conforms in its contour to the frame 5 to be fed by the injection process. A shaping sure 13 for front edge 7 of frame 5, provided in the present instance in lower mold part 12, has a surface roughness 14, obtained, for instance, by sand blasting or etching. The provision of surface roughness 14 in mold 10 causes each cover 3 manufactured in mold 10 to be provided with a surface roughness 8, at least in the area of its front edge 7, preferably, however, across the entire circumference.

Although this immediate creation of a surface roughness by means of a mold is preferable, the frame 5 of the cover 3 could have a roughness provided in the area of its front edge subsequent to formation thereof, for instance, by imprinting, sand blasting, shot blasting, etching, or the like.

While a single embodiment in accordance with the present invention have been shown and described, it is understood that the invention is not limited thereto, and is susceptible to numerous changes and modifications as known to those skilled in the art, beyond those indicated above. Therefore, this invention is not limited to the details shown and described herein, and includes all such changes and modifications as are encompassed by the scope of the appended claims.

We claim:

1. A cover of a vehicle roof for selectively closing, or at least partially exposing a roof opening provided in a rigid vehicle roof which has an edge seal at least in an area of a front edge of the opening; wherein the cover has a frame made of a synthetic material and which extends at least along a front edge thereof, the synthetic material of the frame being textured, at at least a front edge area of the frame, so as to have a surface roughness which forms a means for reducing noises, in use of the cover, upon pivoting of the cover away from the edge seal.

2. Cover according to claim 1, wherein the surface roughness is in the form of a graining.

3. Cover 3, according to claim 1, wherein the synthetic material is polyurethane.

4. Cover 3, according to claim 1, wherein the surface roughness has an average peak valley height in the front edge area of the frame which is approximately 70 $\mu$m to 90 $\mu$m.

* * * * *